(12) United States Patent
Cootes et al.

(10) Patent No.: US 9,928,443 B2
(45) Date of Patent: Mar. 27, 2018

(54) IMAGE PROCESSING APPARATUS AND METHOD FOR FITTING A DEFORMABLE SHAPE MODEL TO AN IMAGE USING RANDOM FOREST REGRESSION VOTING

(71) Applicant: The University of Manchester, Manchester (GB)

(72) Inventors: Timothy Cootes, Manchester (GB); Claudia Lindner, Manchester (GB); Mircea Ionita, Manchester (GB)

(73) Assignee: The University of Manchester, Manchester (GB)

( * ) Notice: Subject to any disclaimer, the term of this patent is extended or adjusted under 35 U.S.C. 154(b) by 39 days.

(21) Appl. No.: 14/423,961

(22) PCT Filed: Sep. 3, 2013

(86) PCT No.: PCT/GB2013/052303
§ 371 (c)(1),
(2) Date: Feb. 25, 2015

(87) PCT Pub. No.: WO2014/037709
PCT Pub. Date: Mar. 13, 2014

(65) Prior Publication Data
US 2015/0186748 A1 Jul. 2, 2015

(30) Foreign Application Priority Data
Sep. 6, 2012 (GB) .................... 1215944.8

(51) Int. Cl.
*G06K 9/62* (2006.01)
*G06K 9/00* (2006.01)
(52) U.S. Cl.
CPC ......... *G06K 9/621* (2013.01); *G06K 9/00281* (2013.01); *G06K 9/00382* (2013.01); *G06K 9/6282* (2013.01)

(58) Field of Classification Search
CPC .. G06K 9/00281; G06K 9/6209; G06K 9/621; G06K 9/00248; G06K 9/6282; G06K 2009/4666; G06K 9/00335
See application file for complete search history.

(56) References Cited

PUBLICATIONS

Generic face alignment using an improved Active Shape Model Liting Wang; Xiaoqing Ding; Chi Fang Audio, Language and Image Processing, 2008. ICALIP 2008. International Conference on Year: 2008 pp. 317-321, DOI: 10.1109/ICALIP.2008.4590037.*

(Continued)

*Primary Examiner* — Kim Vu
*Assistant Examiner* — Michael Vanchy, Jr.
(74) *Attorney, Agent, or Firm* — Park, Vaughan, Fleming & Dowler LLP

(57) ABSTRACT

One embodiment of the invention provides an image processing method for use in fitting a deformable shape model to an acquired image. The deformable shape model specifies a set of target points whose motion is governed by the model. The method comprises, for each target point, generating a corresponding response image by: providing a feature detector to locate a given target point within the acquired image, wherein said feature detector includes a random forest comprising one or more decision trees; scanning a patch image across the acquired image to define multiple sampling locations with respect to the acquired image; for each sampling location of the patch image with respect to the acquired image, performing regression voting using the random forest to produce one or more votes for the location of the given target point within the acquired image; and accumulating the regression votes for all of the multiple sampling locations to generate said response image corresponding to the given target point. The method further includes then performing an optimization to determine positions for the set of target points within the acquired image (Continued)

based on the corresponding response images and subject to constraint by the deformable shape model.

16 Claims, 14 Drawing Sheets

(56) References Cited

PUBLICATIONS

Automatic Construction of Parts+Geometry Models for Initializing Groupwise Registration Pei Zhang; Timothy F. Cootes IEEE Transactions on Medical Imaging Year: 2012, vol. 31, Issue: 2 pp. 341-358, DOI: 10.1109/TMI.2011.2169077.*

Real time head pose estimation with random regression forests Gabriele Fanelli; Juergen Gall; Luc Van Gool Computer Vision and Pattern Recognition (CVPR), 2011 IEEE Conference on Year: 2011 pp. 617-624, DOI: 10.1109/CVPR.2011.5995458.*

Saragih et al., "Deformable Model Fitting by Regularized Landmark Mean-Shift" International Journal of Computer Vision Jan. 2011, vol. 91, Issue 2, pp. 200-215.*

Litting Wang et al: "Generic face alignment using an improved Active Shape Model", Audio, Language and Image Processing, 2008. ICALIP 2008. International Conference on, IEEE, Piscataway, NJ, USA, Jul. 7, 2008 (Jul. 7, 2008), pp. 317-321, XP031298393, ISBN: 978-1-4244-1723-0 the whole document.

Pei Zhang et al: "Automatic Construction of Parts+Geometry Models for Initializing Groupwise Registration", IEEE Transactions on Medical Imaging, IEEE Service Center, Piscataway, NJ, US, vol. 31, No. 2, Feb. 1, 2012(Feb. 1, 2012), pp. 341-358, XP0411491025, ISSN: 0278-0062, DOI: 10.1109/TMI.2011.2169077 p. 343-p. 348.

Gall J et al: "Class-specific Hough forests for object detection", 2009 IEEE Conference on Computer Vision and Pattern Recognition : CVPR 2009 ; Miami [Beach] Florida, USA, Jun. 20-25, 2009, IEEE, Piscataway, NJ, Jun. 20, 2009 (Jun. 20, 2009), pp. 1022-1029, XP031607267, ISBN: 978-1-4244-3992-8 cited in application p. 1022-p. 1026.

Matthias Dantone et al: "Real-time facial feature detection using conditional regression forests", Computer Vision and Pattern Recognition (CVPR), 2012 IEEE Conference on, IEEE, Jun. 16, 2012 (Jun. 16, 2012), pp. 2578-2585, XP032208901, DOI: 10.1109/CVPR.2012.6247976 ISBN: 978-1-4673-1226-4 cited in application the whole document.

Cootes T F et al: "Active Shape Models—Their Training and Application", Computer Vision and Image Understanding, Academic Press, US, vol. 61, No. 1, Jan. 1, 1995 (Jan. 1, 1995), pp. 38-59, XP000978654, ISSN: 1077-3142, DOI: 10.1006/CVIU.1995.1004 cited in application the whole document.

* cited by examiner

Mode 1
Mode 2
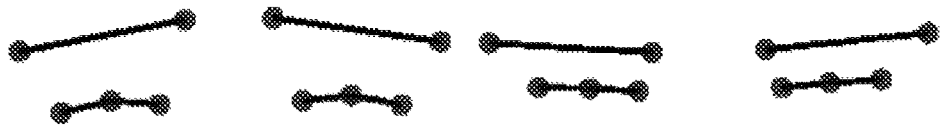
Mode 3
Figure 4

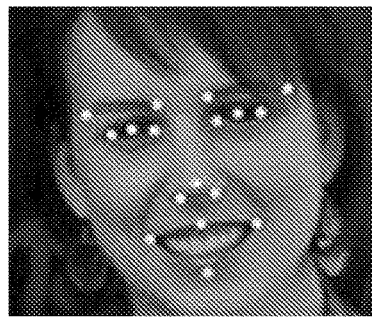 
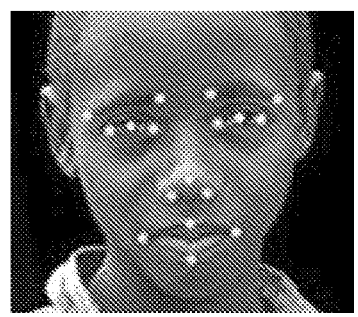 
Figure 10a ($m_{17} < 5\%$)
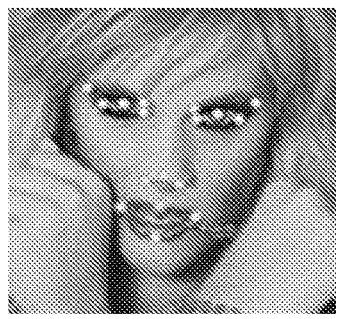 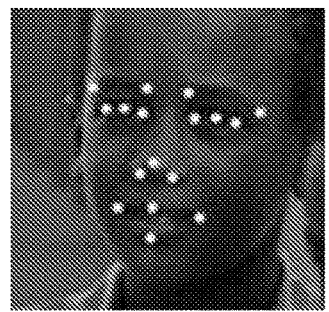
 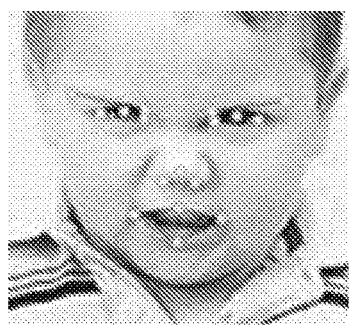
Figure 10b ($5\% \leq m_{17} \leq 10\%$)

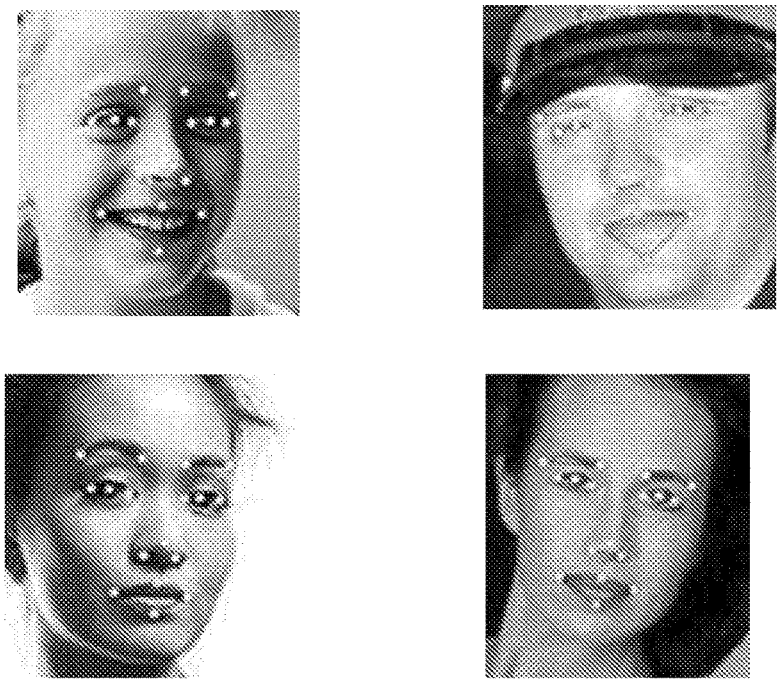
Figure 10c ($10\% \leq m_{17} \leq 15\%$)
Figure 10d ($m_{17} \geq 15\%$)

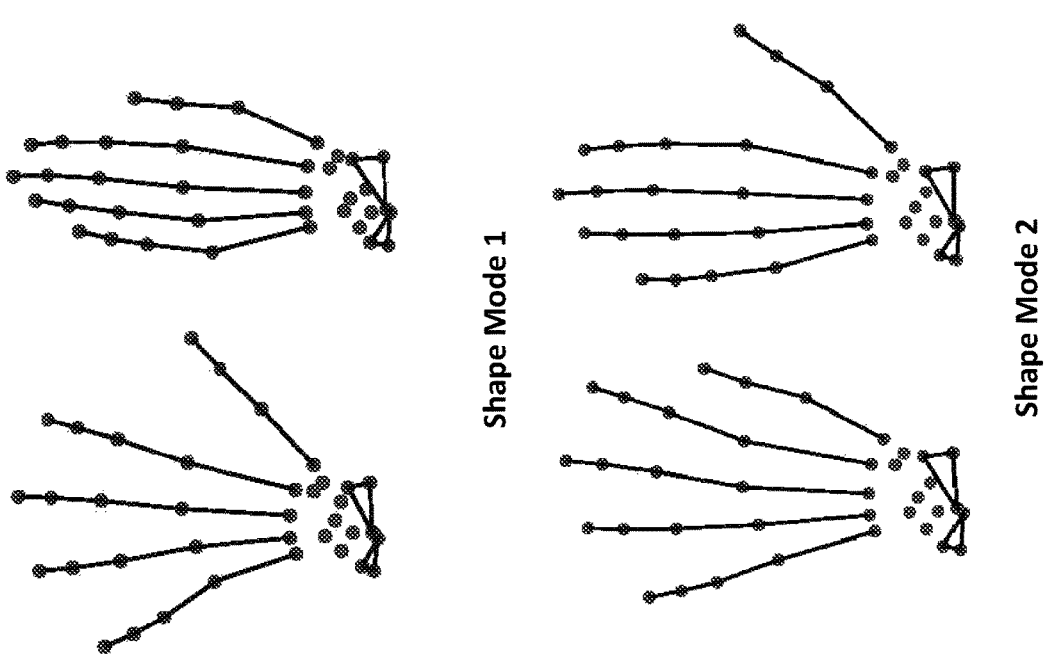
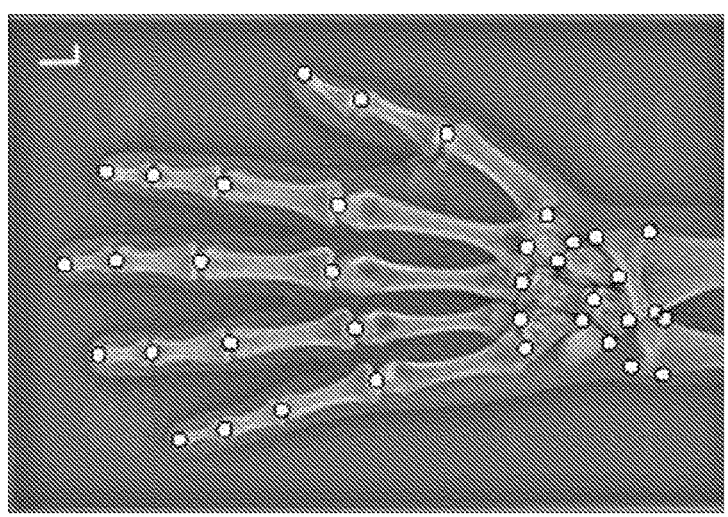
Figure 11

IMAGE PROCESSING APPARATUS AND METHOD FOR FITTING A DEFORMABLE SHAPE MODEL TO AN IMAGE USING RANDOM FOREST REGRESSION VOTING

FIELD OF THE INVENTION

The present invention relates to an image processing method for fitting a deformable shape model to an acquired image, and in particular to an image processing method that uses a set of random forests to perform regression voting to fit the deformable shape model to the image.

BACKGROUND OF THE INVENTION

The ability to detect accurately features of deformable models is important for a wide range of image processing algorithms and applications. A widely used approach is to use a statistical shape model to regularise the output of independent feature detectors trained to locate each model point within two-dimensional (2D) or three-dimensional (3D) image data. One common example of this approach is based on Active Shape Models [1], in which a shape model is fitted to the results of searching around each model point with a suitably trained detector. Active Appearance Models (AAMs) [8] match combined models of shape and texture using an efficient parameter update scheme. Pictorial Structures [3] introduced an efficient method of matching part-based models to images, in which shape is encoded in the geometric relationships between pairs of parts.

Constrained Local Models [4, 5] build on a framework in which response images are computed estimating the quality of fit of each model point at each point in the target image. This then allows a shape model to be matched to the data, selecting the overall best combination of points. Note that a response image represents the spatial distribution of the value of the estimated quality of fit across a portion of the original image space.

Belhumeur et al. [9] have shown impressive facial feature detection results using sliding window detectors (SVM classifiers trained on SIFT features) combined with a RANSAC approach to select good combinations of feature points.

The task of a feature detector in such an approach is to compute a (pseudo) probability that a target point from a model occurs at a particular position in an acquired 2-dimensional (2D) or 3-dimensional (3D) image. This can be expressed as $p(x|I)$, namely the probability that a given target point from the deformable model is located at position x, given the acquired image information I. (Where a technique returns a quality of fit measure, C, we assume that this can be converted into a pseudo-probability using a suitable transformation).

Local peaks in the function $p(x|I)$ correspond to candidate positions, for example in an ASM. Another possibility, for example in CLMs and Pictorial Structures, is that the probabilities for each point are combined with the shape model information to find the best overall match. In this latter approach, the set of local probabilities regarding the positions of respective target points in the image are utilised in combination with the statistical shape model itself to determine a mapping of the deformable model onto the image, including a suitable deformation of the model, which has the highest overall global probability. In other words, this approach considers how likely it is that (a) a given portion of the image corresponds to a given target (based on the feature detector), and (b) the shape model as a whole can be deformed into a particular configuration of target points.

A wide variety of feature detectors have been used in such frameworks. These can be broadly classified into three types:
Generative in which generative models are used, so $p(x|I) \propto p(I|x)$.
Discriminative in which classifiers are trained to estimate $p(x|I)$ directly.
Regression-Voting in which $p(x|I)$ is estimated from accumulating votes for the position x of the point given information in nearby regions.

Although there has been a great deal of work matching deformable models using the first two approaches, the Regression-Voting approach has only recently begun to be explored in this context.

Regression based matching: One of the earliest examples of regression based matching techniques was the work of Covell [10] who used linear regression to predict the positions of points on the face. The original AAM [11] algorithm used linear regression to predict the updates to model parameters. Non-linear extensions include the use of Boosted Regression [12, 13] and Random Forest Regression [14]. The Shape Regression Machine [15] uses boosted regression to predict shape model parameters directly from the image (rather than the iterative approach used in AAMs). Zimmerman and Matas [16] used sets of linear predictors to estimate positions locally, an approach used for facial feature tracking by Ong and Bowden [17]. Dollár et al. [18] use sequences of Random Fern predictors to estimate the pose of an object or part.

Regression based voting: Since the introduction of the Generalised Hough Transform [19], voting based methods have been shown to be effective for locating shapes in images, and there have been many variants of this approach. For instance, the Implicit Shape Model [20] uses local patches located on an object to vote for the object position, and Poselets [21] match patches to detect human body parts. Hough Forests [6] use Random Forest regression from multiple sub-regions to vote for the position of an object. This includes an innovative training approach, in which regression and classification training are interleaved to deal with arbitrary backgrounds and where only votes believed to be coming from regions inside the object are counted. This work has shown that objects can be effectively located in an image by pooling votes from Random Forest regressors. Valstar et al. [7] showed that facial feature points can be accurately located using kernel SVM based regressors to vote for each point position combined with pair-wise constraints on feature positions. Girshick et al. [22] showed that Random Forests can be used to vote for the position of joint centres when matching a human body model to a depth image. Criminisi et al. [26] use Random Forest regression to vote for the positions of the sides of bounding boxes around organs in CT images. Dantone et al. [23] have used conditional random forests to find facial features.

SUMMARY OF THE INVENTION

The invention is defined in the appended claims.

One embodiment of the invention provides an image processing method or apparatus for use in fitting a deformable shape model to an acquired image. The deformable shape model specifies a set of target points whose motion is governed by the model. The method and apparatus support, for each target point, generating a corresponding response image from the acquired image by: providing a feature detector to locate the target point within the acquired image, wherein said feature detector includes a random forest comprising one or more decision trees; scanning a patch image across the acquired image to define multiple sampling locations with respect to the acquired image; for each sampling location of the patch image with respect to the acquired image, performing regression voting using the random forest to produce one or more votes for the location of the target point within the acquired image; and accumulating the regression votes for all of the multiple sampling locations to generate said response image corresponding to the target point. The approach further comprises performing an optimization to determine positions for the set of target points within the acquired image based on the corresponding response images and subject to constraint by the deformable shape model.

The deformable shape model typically (but not necessarily) relates to a part of the human body, such as face, hand or leg. The determination of the locations of the target points then help to recognize the configuration of this body part, such as a facial expression, or positioning of a hand and fingers.

In some embodiments, producing one or more votes for a sampling location comprises, for each decision tree, determining a single vote at the mean predicted offset for that decision tree. Each response image comprises a grid of cells, and accumulating the regression votes comprises, for each cell, counting the number of regression votes that fall into the cell. This provides a computationally quick implementation while providing accurate locations for the target points.

In some embodiments, only a subset of pixels in the acquired image are chosen as sampling locations—for example, every other pixel. Again, this provides a computationally quick implementation while providing accurate locations for the target points.

In some embodiments, there is an initial step of converting the acquired image to a reference image corresponding to a standard presentation. The subsequent processing, such as generating the response images, is then performed using the reference image. The standard presentation may represent, for example, a frontal image of a face having a set size or scale within the image. This allows a good initial estimate to be made for the locations of the different target points within the reference image, which can help to provide results in a more reliable and quicker fashion.

In some embodiments, the optimization includes:
a) providing an initial estimate of the locations of the target points;
b) searching each response image for a peak within a predetermined distance of the estimated location of a corresponding target point;
c) updating the estimated locations of the target points to match the peak found in each respective response image;
d) fitting the deformable shape model to the updated estimated locations of the target points; and
e) using the fitted deformable shape model to provide updated estimated locations of the target points.

Steps (b)-(e) are iterated, subject to one or more termination criteria, such as a maximum number of iterations, and/or convergence between iterations of the updated estimated locations of the target points. The approach may further involve reducing the predetermined distance at each iteration to help convergence.

In some embodiments, a valid region in parameter space is defined for parameters of the deformable shape model, which corresponds to model configurations that have an acceptable probability of occurrence. Any fit of the deformable shape model that lies outside this region (i.e. that has a lower probability of occurrence) is excluded. Such an excluded model configuration may be substituted in the optimization by the model configuration lying on the boundary surface of the valid region.

A widely used approach for locating points on deformable objects is to generate feature response images for each point, then to fit a shape model to the response images. We demonstrate that random forest regression can be used to generate high quality response images quickly. Rather than using a generative or a discriminative model to evaluate each pixel, a regressor is used to cast votes for the optimal position. This leads to fast and accurate matching when combined with a statistical (deformable) shape model. The technique is evaluated in detail, and compared with a range of commonly used alternatives on several different datasets. It is shown that the random forest regression method is significantly faster and more accurate than equivalent discriminative, or boosted regression based methods trained on the same data.

BRIEF DESCRIPTION OF THE DRAWINGS

Various embodiments of the invention will now be described in detail by way of example only with reference to the following figures:

FIG. 4 illustrates the first (most significant) 3 modes of variability of the deformable shape model of a face shown in FIG. 1.

FIG. 7 illustrates the comparative performance for configuring the overall set of target points for the deformable shape model of the face shown in FIG. 1. The graph suggests that random forest regression voting produces a more accurate fit for the overall model with reduced computational complexity.

FIG. 10 illustrates the results of some of the fits of the deformable shape model to an image obtained as part of the processing of FIG. 9.

FIG. 11 illustrates an example radiographic image of the wrist, and a deformable model which has been fitted to the wrist, based on the positions of the target points that have been predetermined via a manual process. FIG. 11 also illustrates two modes of variation within this shape model.

DETAILED DESCRIPTION

Constrained Local Models

A constrained local model (CLM) provides a method for matching the points of a statistical shape model to an image. Here we summarise the key points of the approach—further details can be found, for example, in [4,5]. We use a linear model of shape variation [1] which represents the position of each target point from the model as:

$$x_i = T(\bar{x}_i + P_i b; t) \quad (1)$$

where b represents the parameters of the model, $\bar{x}_i$ is the mean position of the target point in a suitable reference frame, $P_i$ a set of modes of variation, and $T(\bullet;t)$ applies a global transformation (e.g. similarity) with parameters t.

To match the model to a new image, I, we seek the points $x=\{x_i\}$ which optimise the overall quality of fit of the model to the image.

More formally, we seek parameters p={b, t} which minimize $$Q(p) = -\log p(b, t \mid I) = -\log p(b) - \alpha \sum_{i=1}^{N} \log p(x_i \mid I) \quad (2)$$

where the scaling factor α is included to take account of the fact that the conditional probabilities for each point, $p(x_i|I)$, are not strictly independent, and we have assumed that all poses are equally likely, so p(b, t)=p(b).

Given an estimate of the scale and orientation, we can scan the target image to compute quality of fit $C_i(x_i)=-\log p_i(x_i|I)$. The objective function is then $$Q(p) = -\log p(b) + \alpha \sum_{i=1}^{N} C_i(x_i) \quad (3)$$

The first term encodes the shape constraints, the second the image matching information. The cost function Q(p) can then be optimised either using a general purpose optimiser [4], or using the mean-shift approach advocated by Saragih et al. [5].

Examples of quality of fit functions, C(x), for each point include using normalised correlation with a globally constrained patch model [4] or sliding window search with a range of classifiers [5, 9]. As described herein, we show that Random Forest regression can be used to produce effective cost maps, leading to fast, robust and accurate performance.

Figure 1:
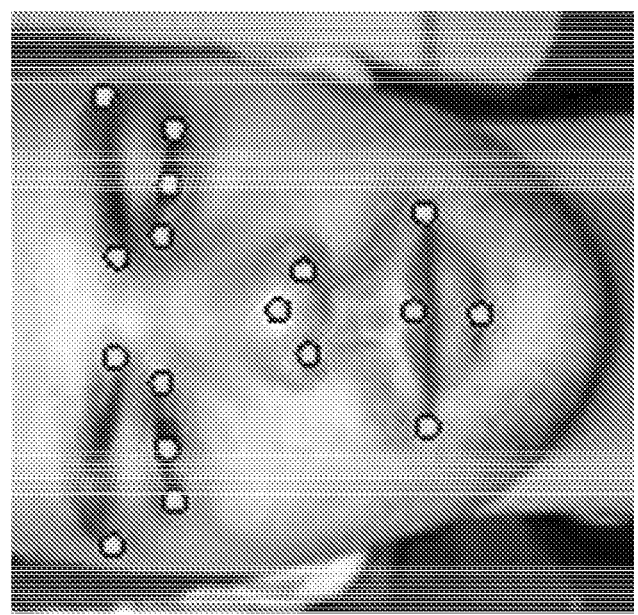
FIG. 1 illustrates an image of a face, with a set of target points for a deformable shape model of the face superimposed on the image.

FIG. 1 shows an image of a face, and the locations within the image of 17 target points utilised in a deformable shape model of the face. In other words, the deformable shape model predicts or characterizes how the locations of these target points will vary, where such variation might reflect physical differences from one face to another, and/or a change in facial expression of a given face. It will be appreciated that in addition to such variations in the underlying shape model, the locations and visibility of the target points in any given image are dependent on the orientation and scaling of the face in the image. Furthermore, the appearance of any given target point from the model in a particular image is subject to a number of sources of variation. Thus physical differences from one face to another, and/or a change in facial expression may alter the appearance of a target model point (not just its location relative to the other target points). The appearance of a target point in a given image may also be dependent on other factors, such as the particular lighting applied for the image, any occlusion (e.g. by hair or glasses), etc.

Voting with Random Forest Regressors

In the Regression-Voting approach, we evaluate a set of points in a grid which can be regarded as superimposed over a region of interest from the original image. At each point, z, of the grid, a set of features, f(z), are sampled based on the underlying image data. A regressor, d=R(f(z)), is trained to predict the most likely position of the model target point relative to z, and hence in relation to the underlying image. The predictions are used to vote for the best position in an accumulator array V, so V(z+d)→V(z+d)+v where v expresses the degree of confidence in the prediction. After scanning the whole region of interest, V can be smoothed to allow for uncertainty in the predictions. For instance, [7] uses an SVM regressor, with each sample voting for one nearby point.

Figure 2:
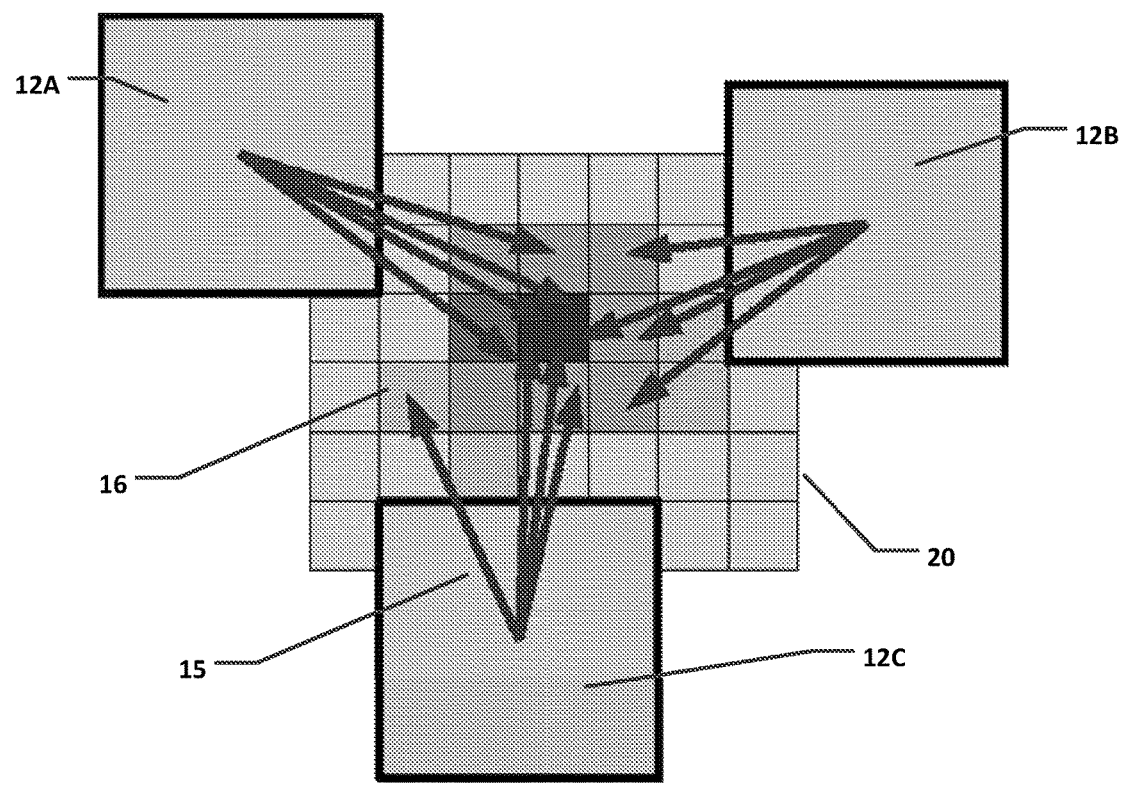
FIG. 2 illustrates how votes are accumulated via the random forest for different positions of a patch image.

FIG. 2 illustrates the Regression-Voting approach, which utilises a patch image 12 corresponding to the target model point of interest—e.g. one of the 17 different points shown in FIG. 1. In other words, a different patch image is used for each of the different model points. The patch image is scanned across the original according to a grid which can be regarded as superimposed over a region of interest from the original image. FIG. 2 illustrates three different positions of the patch image, 12A, 12B and 12C, each of which therefore overlies a different portion of the original image. For each of these different positions, a regression technique is used to determine the expected position of the target point corresponding to the patch image, based on the patch image itself, and the portion of the original image that underlies the patch image in this position. Depending on the particular technique employed, e.g. which features are extracted from the original image data, a single patch image position may produce one or more predictions for the position of the target point. In the example of FIG. 2, four predictions are produced for each position of the patch image (as discussed below in more detail), where each prediction for each patch position is denoted by a corresponding arrow 15. Each prediction represents or corresponds to a vote, and all of the votes are accumulated in a grid 20, which can be regarded as spatially coincident with the original image. The grid 20 is divided into cells, and the number of predictions (votes) for each cell is counted (accumulated). For example, arrow 15 terminates in cell 16, and therefore represents a vote or prediction for this cell. The number of votes for a given cell is schematically (and approximately) indicated in FIG. 2 by the darkness of the cell.

Figure 3:
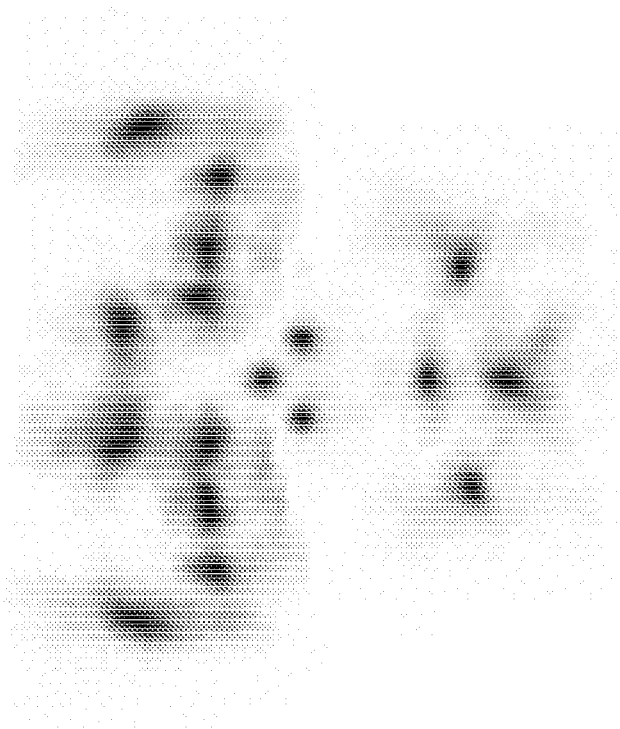
FIG. 3 illustrates the result of accumulating votes for different response images (each response image corresponding to a respective target point from the set of target points shown in FIG. 1). The response images are superimposed on one another for presentation, although the processing is performed separately for each response image and corresponding target point.

FIG. 3 shows a superposition of vote accumulation from each position of the patch images for each of the 17 target points of the 17 point face model shown in FIG. 1. Note that the vote accumulation is performed independently in respect of each model (target) point, so that the vote accumulation for a given model point can be regarded as representing a separate plane. FIG. 3 therefore shows the superposition of each separate plane of vote accumulation, where each of the different planes has been aligned with respect to the original image (and hence the different planes are also all aligned with respect to each other).

One advantage of the regression approach is that it avoids the somewhat arbitrary cut-off radius sometimes required when selecting positive and negative examples for training. It also allows integration of evidence from regions of the original image that do not overlap the target point.

The Regression-Voting can be enhanced by using multiple (independent) regressors, or by having each regressor predict multiple positions (as illustrated in FIG. 2). Both approaches are combined in Hough Forests [6] which use sets of random trees whose leaves store multiple training samples. Thus each sample produces multiple weighted votes, allowing for arbitrary distributions to be encoded. It is also known, see [22] and [26], to produce votes in higher dimensional spaces (3D or 6D), but these work directly with the vector votes rather than accumulator arrays. Random Forests [27] have been shown to be effective in a wide range of classification and regression problems. Each random forest comprises a set of one or more binary trees, each tree stochastically trained on a subset of the data randomly selected for that particular tree. Although any one tree may be somewhat overtrained, the randomness in the training process encourages multiple trees to give independent estimates, which can be combined to achieve an accurate and robust result.

In one embodiment, we use Random Forest regression, accumulating votes in a 2D array such as shown in FIG. 2. After having been trained on its randomly selected subset of the data, each tree can be used to generate one or more votes by performing a regression based on the image being tested and a given location of a patch image—see FIG. 2. Each tree allows a rapid calculation of the regression based on a hierarchical calculation, starting from a single node at the top of the tree (the root node). Each level of calculation selects a branch to follow down (through the tree) to a node at the next lowest level. Eventually a leaf node is reached, which calculates the estimated regression that can be considered as the "vote" of this tree. Because the calculation at each node (except the leaf nodes) only involves determining which branch to take (traverse) to the next lowest node of the tree, the calculations are generally quick.

A significant advantage of decision trees is that each leaf can store arbitrary information derived from the training samples which arrived at that leaf, $\{d_k\}$. For instance, this could be the mean, $\bar{d}$, and covariance $S_d$ of these samples, or the full set of samples.

When scanning the target region, a range of styles of voting can be used, including (but not limited to) the following:

1. A single, unit vote per tree at the mean offset.
2. A single, weighted vote per tree, using a weight of $|S_d|^{-0.5}$. This penalises uncertain predictions.
3. A Gaussian spread of votes, $N(\bar{d}, S_d)$.
4. Multiple votes from the training samples [6].

In the experiments below we compare these different approaches, and show that using a single vote per tree gives the best performance, both in terms of accuracy and speed in our applications.

If the number of votes cast for the point to be at pixel x is $V(x)$, then we set the cost map image to be given as $C(x) = -\log(\max(V(x), v_0))$, where $v_0 > 0$ introduces robustness to occlusion by allowing points to have a non-zero probability of occurring anywhere.

An advantage of using regression voting, rather than classification, is that good results can be obtained by evaluating on a sparse grid, rather than at every pixel. In other words, the patch image of FIG. 2 can be scanned across the original underlying image, and a regression performed at every sampling point, where the sampling points can have a lower spatial frequency than the pixels in the original image. For example, sampling every third pixel speeds up the process by a factor of nine, with minimal loss of accuracy (see results below).

Training

The models are trained from sets of images, each of which is annotated with the feature points of interest on the object, x. A statistical shape model is trained by applying principal component analysis (PCA) to the aligned shapes [1]. The model is scaled so that the width of the bounding box of the mean shape is a given value, $w_{ref}$ (typically in the range 50-150 pixels).

The shape model is used to assess the global pose, t, of the object in each image, by minimising $|T(\bar{x}; t) - x|^2$. Each image is resampled into a standardized reference frame by applying the inverse of the pose, $I_{ref}(i,j) = I(T(I,j;t))$.

To train the detector for a single feature point we generate samples by extracting features $f_j$ at a set of random displacements $d_j$ from the true position in the reference frame, $T^{-1}(x_i; t)$, where $x_i$ is the position of the point in the image. Displacements are drawn from a flat distribution in the range $[-d_{max}, -d_{max}]$ in x and y. To allow for inaccurate initial estimates of the pose, we repeat this process with random perturbations in scale and orientation of the estimate of the pose. We then train a set of randomised decision trees [27] on the $N_s$ pairs $\{f_j, d_j\}$. To train one tree we take a bootstrap sample (drawing $N_s$ examples with replacement) of the training set, and then use a standard, greedy approach to construct the tree, recursively splitting the data at each node. Given the samples at a particular node, we seek to select a feature and threshold to best split the data into two compact groups. Let $f_i$ be the value of one feature associated with sample i. The best threshold, t, for this feature at this node is that which minimizes $$G_T(t) = G_T(\{d_i : f_i < t\}) + G(\{d_i : f_i \geq t\}) \quad (4)$$

where G(S) is a function evaluating the set of vectors S. In the following we use an entropy measure $G(\{d_i\}) = N \log|\Sigma|$ where $\Sigma$ is the covariance matrix of the N samples. In the experiments below we use Haar-like features [28] sampled in a box around the current point, as they have been found to be effective for a range of applications and can be calculated efficiently from integral images.

Thus to select the feature and threshold at each node, we choose a random set of features from all possible Haar features, then choose the feature and associated optimal threshold which minimises $G_T$. Following [29] we speed up the training by only using a random subset of the available data at each node to select the feature and threshold. In the following we use random subsets of size 400 when there are more than 400 samples to be processed at the node.

Shape Model Matching

Given an initial estimate of the pose of the model (either from a detector or from an earlier model), we seek to find the model parameters which optimise Q(p) (Eq. 3). In order to focus on the effect of the methods used to compute the quality of fit images, $C_i(x_i)$ in the experiments below, we follow [1] in assuming a flat distribution for the model parameters, b within hyper-ellipsoidal bounds:

$$p(b) = \begin{cases} p_0 & \text{if } b^T S_b^{-1} b \leq M_t \\ 0 & \text{otherwise} \end{cases} \quad (5)$$

where $S_b$ is the covariance matrix of the parameters and $M_t$ is a threshold on the Mahalanobis distance. $M_t$ is chosen using the CDF of the $\chi^2$ distribution so that 99% of samples from a multivariate Gaussian of the appropriate dimension would fall within it. In this case, optimising Q(p) is equivalent to optimising $$Q_0(b, t) = \sum_{i=1}^{N} C_i x_i \text{ subject to } b^T S_b^{-1} b \leq M_t \quad (6)$$

This has the advantage that it avoids having to choose the value of $\alpha$.

Given initial estimates of b and t, we first transform the image into the reference frame by resampling using the current pose: $I_{ref}(i,j) = I(T(i,j;t))$. We then compute the cost images, $C_i(\cdot)$, by searching in $I_{ref}$ around the current estimate of each point in the reference frame.

We then estimate the shape model parameters using the following simple but robust model fitting approach in the reference frame:

1. $r = r_{max}$, $t_{ref}$=Identity, $x_i = \bar{x}_i + P_i b$
2. while $r \geq r_{min}$
   (a) Search in disk of radius r for best points:

$$x_i \rightarrow \arg\min_{y:|y-x_i|<r} C_i(y)$$

(b) Estimate the shape and pose parameters, b, $t_{ref}$, to fit the points
   (c) If $b^T S_b^{-1} b > M_t$, move b to nearest valid point on limiting ellipsoid
   (d) Regularise the points: $x_i \rightarrow (\bar{x}_i + P_i b; t_{ref})$
   (e) $r \rightarrow k_r r$
3. Map results to the image frame: $t \rightarrow t \circ t_{ref}$, $x_i \rightarrow T(x_i; t)$.

If the pose changes significantly, the image is resampled at the new pose, the cost images are recomputed, and the above steps are repeated. In the experiments below, we set $r_{max}$ to approximately 25% of the object width, $r_{min}$ to 3 pixels (in the reference image) and $k_r$=0.7.

Experiments on Faces

To compare the performance of the approach with alternatives, and to evaluate the effects of choices of parameters, we train a 17 point model using 1182 images of 105 different people, including a range of head orientations and expressions. FIG. 4 shows the first three modes of the resulting shape model. The reference frame image is 120 pixels wide, and Haar-like features are sampled from patches (patch images) of size 24×24. The regression functions are trained using random displacements of up to 8 pixels in x and y in the reference image, as well as random changes in scale of up to 5% and rotations of up to 3°. Each random forest has 10 trees.

We tested the model on the images from Session 1 of the XM2VTS database [30]. The model begins with the mean shape at a position displaced randomly by up to 15 pixels in x and y and 5% in scale and 3° orientation. Following common practice [4], the error is recorded as the mean error per point as a percentage of the inter-occular distance, $d_{eyes}$. Thus we use $$m_{17} = \frac{1}{17 d_{eyes}} \sum_i |x_i - \hat{x}_i| \quad (7)$$

where $\hat{x}_i$ is the position of the manual annotation for the point, and $d_{eyes} = |\hat{x}_{lefteye} - \hat{x}_{righteye}|$.

Comparison with Other Classifiers/Regressors

Figure 5:
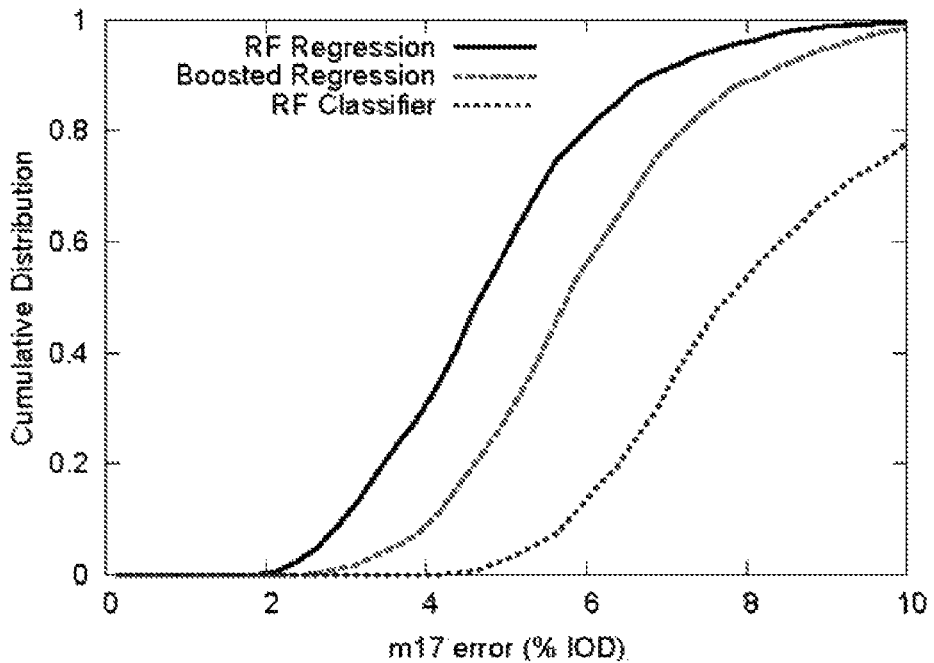
FIG. 5 compares the performance of three different types of feature detector, namely random forest regression voting, boosted regression, and random forest classification, based on a specific data set for which the positions of the target points have been predetermined via a manual process. The random forest regression provides better results (i.e. closer to the predetermined manual positioning) than the other two techniques.

We apply a single stage of the model search and evaluate the performance when using different methods of generating the cost images, all trained on the same data. These are (a) the proposed RF Regression, (b) Boosted regressors (trained on the same features) and (c) RF classification (in which samples within 5% of inter-occular distance of the point are classed as positive examples, the rest as negative examples). FIG. 5 shows the relative performance, in particular, the effect of performance of different local models. The RF regression significantly outperforms the other methods, and is considerably faster (31 ms compared to 140 ms for boosting and 1130 ms for the classifier, when running on a single core).

Effect of Voting Style

Figure 6:
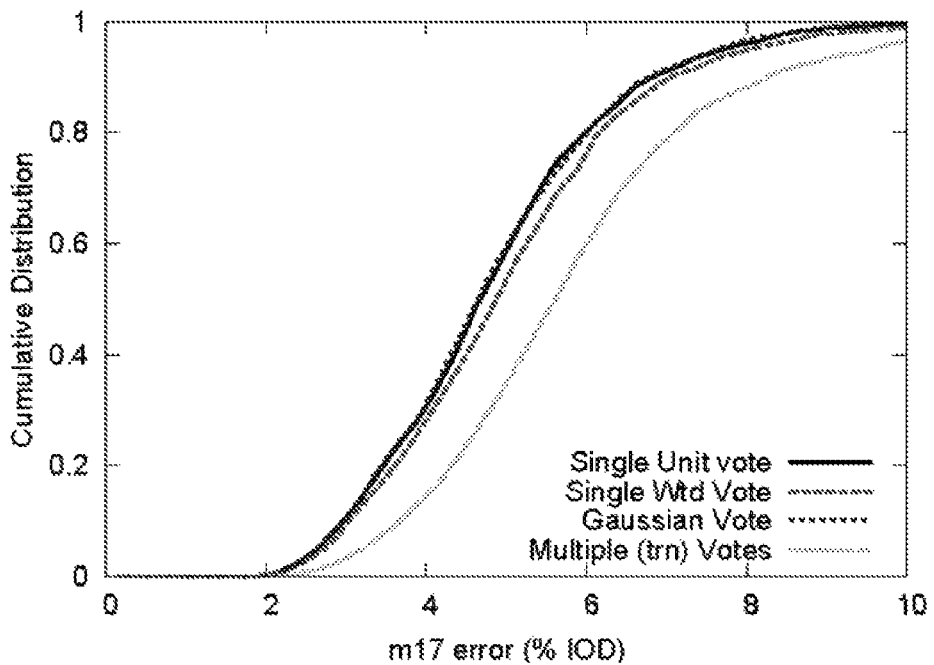
FIG. 6 compares the performance of four different methods for accumulating votes from the random forest across different sampling locations of the patch image. It can be seen that producing a single vote at the mean position for each tree in the random forest gives a result that is at least as good as (if not better) than various other methods of accumulating votes. Moreover producing a single vote at the mean position for each tree in the random forest is computationally straightforward, and therefore supports rapid location of a target point within an image.

We apply a single stage of the model search and evaluate the performance when using different methods of voting. The error is recorded as the mean error per point as a percentage of the inter-occular distance ($m_{17}$). FIG. 6 compares the performance of these different voting schemes. It shows that using a single vote at the mean position for each tree leads to the best overall performance. The only competing method is casting Gaussian votes, however this is significantly slower and gives no significant difference in performance (in terms of localisation accuracy).

Effect of Step Size

Rather than sample every pixel, we need only sample the image on a sparse grid. Since each tree casts votes over a region, we can achieve good accuracy without having to sample everywhere. The table below shows the performance as a function of step size, where step size of s means only take one sample in each s×s square. The table shows that significant subsampling can be used without compromising accuracy.

| Step | Search Time (ms) | Median Error % IOD | 90$^{th}$ % ile % IOD |
|---|---|---|---|
| 1 | 193 | 4.8 | 7.0 |
| 2 | 58 | 4.8 | 6.9 |
| 3 | 31 | 4.8 | 7.0 |
| 4 | 21 | 4.9 | 7.0 |

Test on BioID Data

We test for the generalisation performance of our proposed approach in a naturally unconstrained environment by considering the widely used BioID database. The database consists of 1521 images of several individuals captured in an arbitrary office space scenario using a webcam device. It exhibits natural variations in lighting, background, facial expression or pose, and has been used to test a range of different algorithms. In order to compare with other reported results, we focus on localising the 17 facial features shown in FIG. 1. We initialize the model using a Viola and Jones face detector [28].

Figure 7:
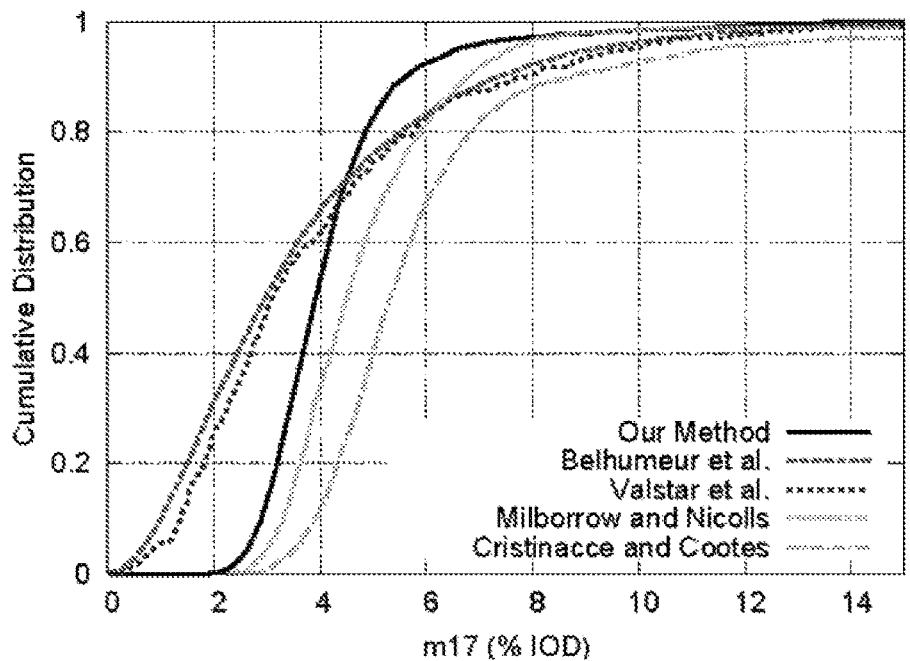
FIG. 7 compares the performance of using random forest regression voting for feature location against some existing techniques described in the literature, based on a specific data set for which the positions of the target points have been predetermined via a manual process. In particular.

The final result is presented as the CDF of $m_{17}$ in FIG. 7, where it is compared to other published results on the same images. In particular, FIG. 7 shows the CDF of the $m_{17}$ measure on BioID compared with [9, 7, 2, 4]. Note that Luo et al. [24] and Cao et al. [25] have recently published results which are slightly better than [9], but follow the same form. Discussions with the authors of [7] suggest that the curves are not directly comparable as they re-annotated some of the data.

Figure 8:
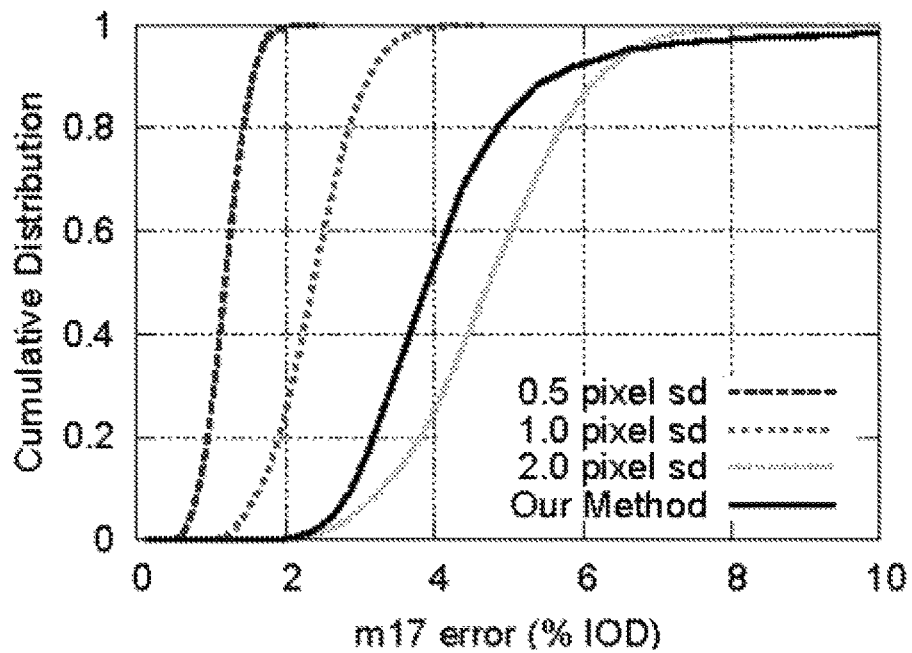
FIG. 8 compares errors of the approach described herein against an 'ideal' system plus noise.

We have also performed an experiment to evaluate the effect of annotation noise on the shape of the CDFs. We added Gaussian noise of SD 0.5, 1 and 2 pixels in x and y to the manual annotations of BioID, and then compared with the original positions. FIG. 8 shows the CDF of $m_{17}$ for different noise levels and our own result. In particular, FIG. 8 shows the CDF of the $m_{17}$ for an 'ideal' system plus noise, and our own results. The shape of the curve for our results is consistent with noise of about 1.5 pixels. The lack of a distinctive "S" shape to the results of [7] and [9] suggests that their point errors are more correlated.

In terms of computational efficiency we believe the approach described herein is one of the fastest. In one implementation, it takes 27 ms on a single core to perform the search given the result of the face detector, compared to many seconds for [9] (though that includes the global search).

Test on AFLW Data

We also tested the system on a subset of 600 images from the Annotated Facial Landmarks in the Wild dataset [31], which includes a wide range of face variation in images sampled from the Internet. We selected all the images from the database for which all 15 frontal landmark points were annotated (about 6700 images). We manually annotated an additional two points to obtain a 17-point markup. Our model was trained using 326 images plus the reflected pairs (652 in total). To test the model, we first applied an off-the-shelf face detector to obtain the initialization data and gathered a total of 4755 images (those for which the face was detected correctly, and removing the images used for training). The model was trained using a slightly different markup (as in the BioID data set)–the centre of the nostrils was annotated instead of the exterior.

Figure 9:
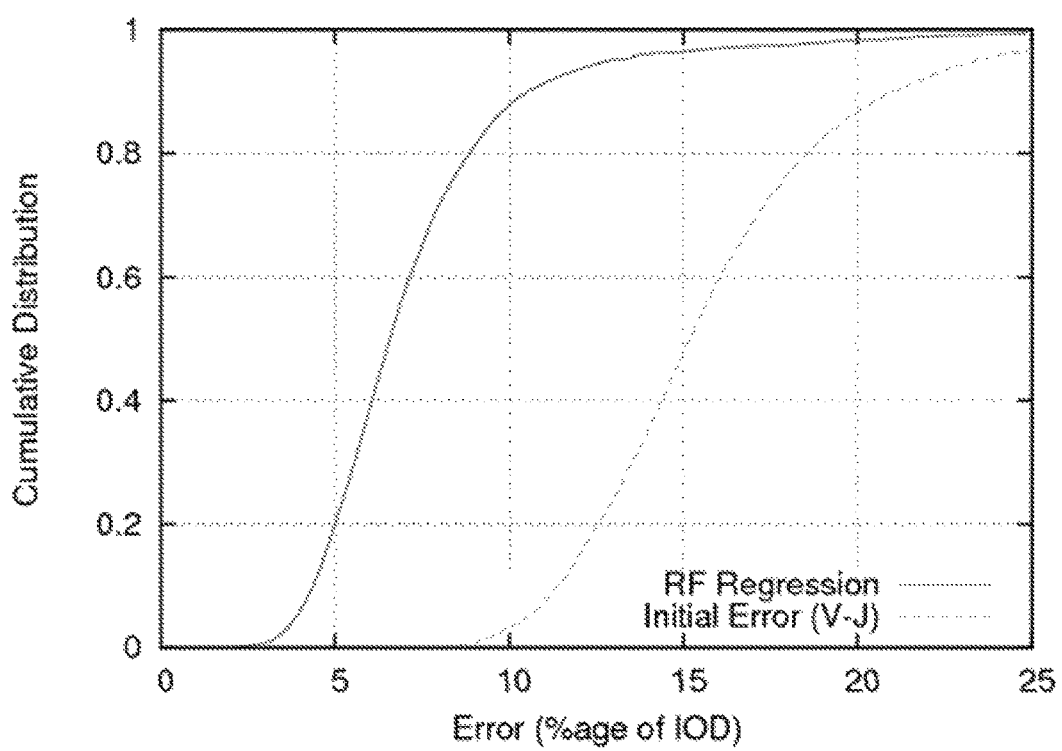
FIG. 9 depicts the performance of random forest regression voting based on a specific data set for which the positions of the target points have been predetermined via a manual process and the deformable shape model of FIG. 1. In particular, FIG. 9 compares the overall fit of the model to the image (a) initially, and (b) after the random forest regression voting.

FIG. 9 shows the CDF of the $m_{17}$ measure before and after running the model from a range of perturbed positions on the set in order to assess the model fitting accuracy on the AFLW data set. FIG. 10 shows example results on this data, i.e. the locations of the target points as found by using random forests to fit a deformable shape model to an image as described herein. The images are grouped on the basis of the value of the $m_{17}$ measure of the mean error per point as defined above.

Performance on Hand Radiographs

To demonstrate that the approach described herein generalises to other application areas, we tested the system on a set of 550 radiographs of hands, each annotated with 37 points. FIG. 11 shows an annotation and two of the shape modes of the resulting model, indicating that there is significant shape variation. In particular, the left-hand side of FIG. 11 depicts a radiograph image of a (left) hand, with the 37 target points of the shape model shown superimposed on the image, while the right-hand side of FIG. 11 shows the first two modes of the shape model, including the configuration and movement of the 37 target points for each shape mode.

Figure 12:
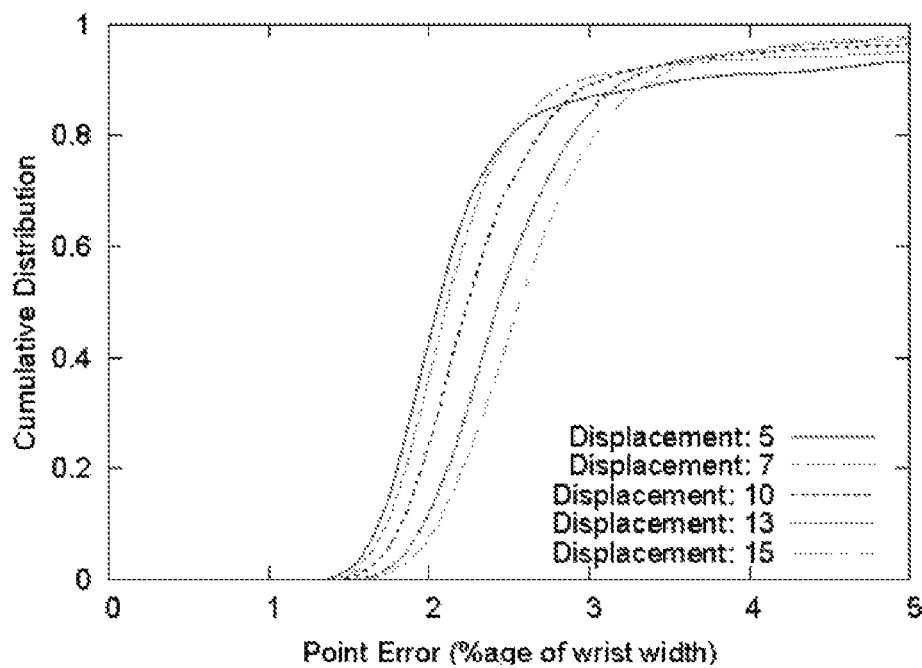
FIG. 12 illustrates the performance of using random forest regression voting for feature location based on the specific data set of radiographic wrist data discussed in relation to FIG. 11. The different curves in FIG. 12 refer to using different displacements in the training data.
Figure 13:
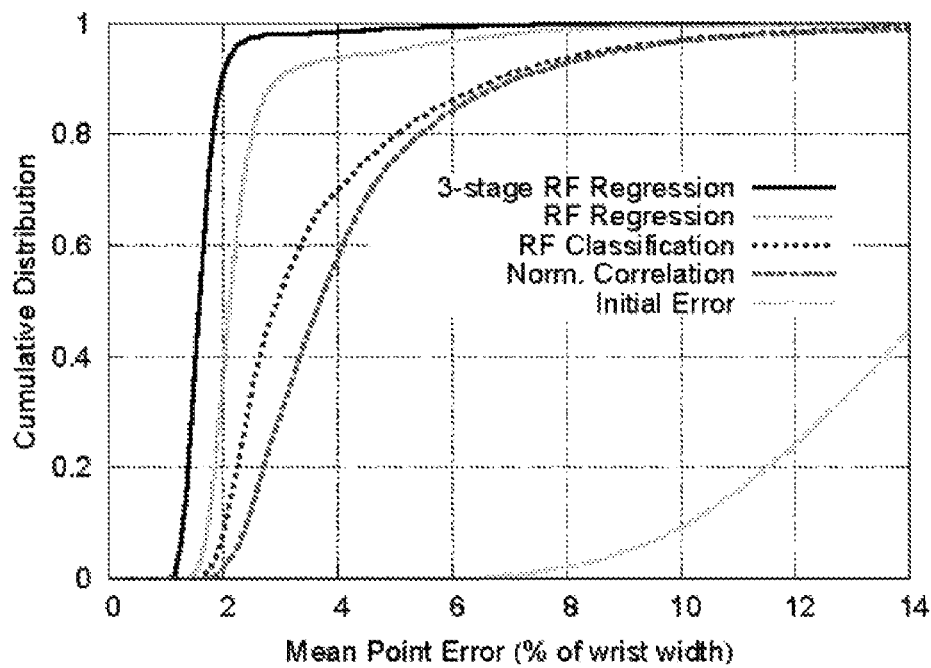
FIG. 13 compares the performance of using random forest regression voting for feature location against various techniques based on the specific data set of radiographic wrist data discussed in relation to FIG. 11. A three-stage random forest regression voting approach gives the best result. The different stages involve using different displacements and size of reference image in the training data.

We trained the models on the first 200 images, then tested on the remainder. In the first experiment we use a model with a 70 pixel wide reference image, and 13×13 pixel patches. We demonstrated the effect of varying the magnitude of the maximum displacements used when training the regressors from 5 to 15 pixels. We measured the error as the mean error relative to the width of wrist (to provide scale invariance). FIG. 12 shows the CDFs of the mean point error for a range of displacements as an indication of performance on the hand radiographs. It shows that larger displacements lead to higher convergence rates, but at the cost of overall accuracy. Such models are useful in the early part of a multi-stage search. FIG. 13 likewise shows performance on the hand radiographs, and demonstrates that excellent results can be achieved with a three stage approach, fitting with a model with ($w_{ref}$=70, 13×13 patches, $d_{max}$=15), then ($w_{ref}$=70, 13×13 patches, $d_{max}$=7) and finally ($w_{ref}$=210, 13×13 patches, $d_{max}$=7). The early stages find the approximate positions, which are refined using the higher resolution model in the final stage. The graph also compares three different local models for the response images: (a) normalised correlation with the mean, (b) a random forest classifier (using the same Haar-like features) and (c) the proposed random forest regression voting approach. In each case reference image was 70 pixels wide, and each patch was 13×13 pixels within the reference frame. In each case the models were initialised with the mean shape but at randomly displaced positions from the correct pose. FIG. 12 shows that the classifier significantly out-performs normalised correlation, but that the regression voting (c) is by far the best overall. Note that the initial error has a median of 17%, which is off the graph. Given that the mean wrist width is about 50 mm, this suggests that more than 90% of the time the mean point error is less than 1 mm.

The methods described above have also been used to form part of a completely automatic system for segmenting the femur in pelvic radiographs, achieving the best published results in that field (see [32]).

Image Processing

Figure 14:
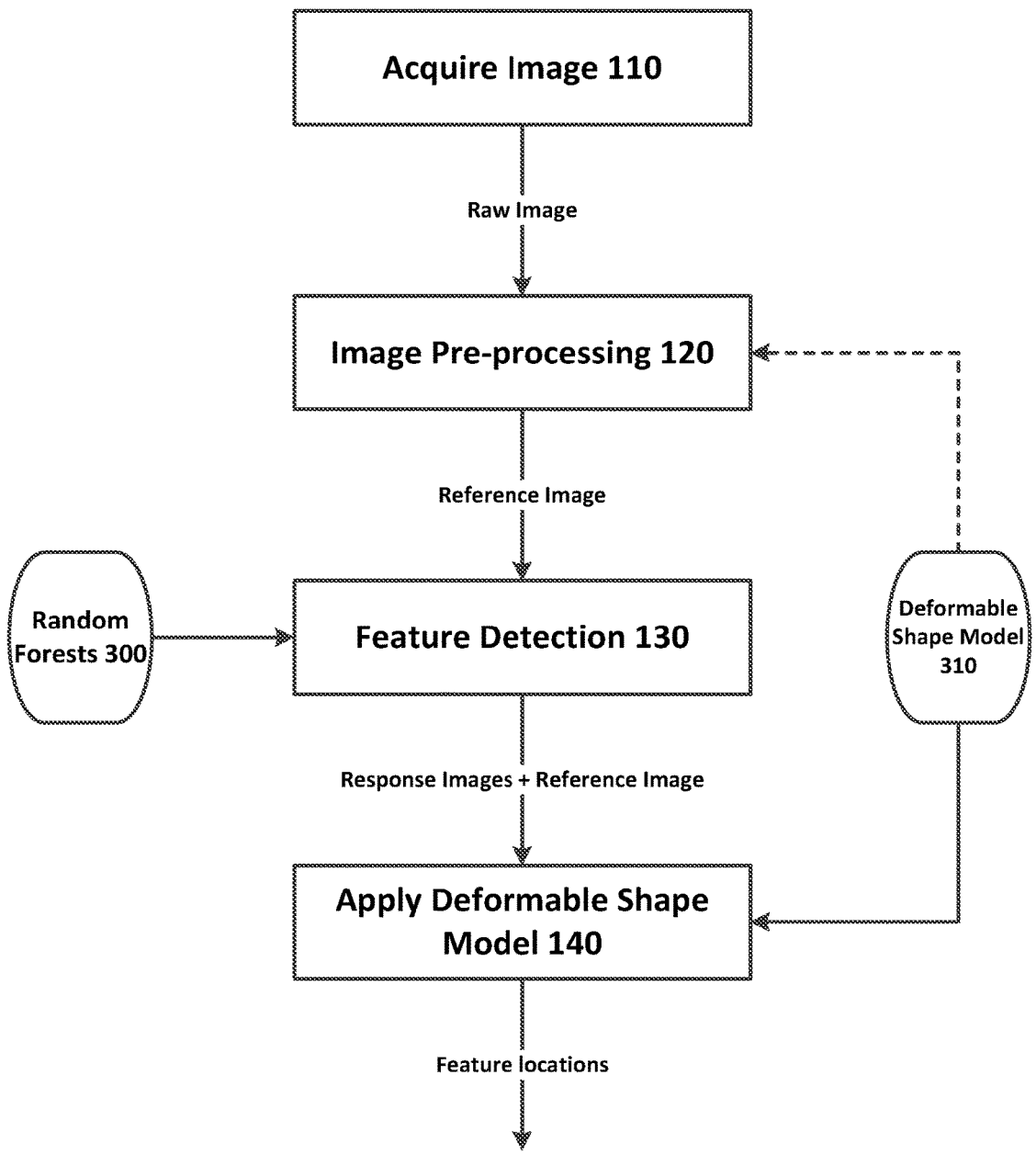
FIG. 14 is a high-level flowchart showing the location of target points within an image in accordance with one embodiment of the invention.

FIG. 14 is a flowchart illustrating the high-level image processing of a method in accordance with one embodiment of the invention. The method commences with acquiring an image (110), for example, using a camera, or any other appropriate imaging device, such as an MRI device, an X-ray imaging system, and so on. It will be appreciated that the image acquisition (110) may be performed as a initial step, separate from the remaining (subsequent) image processing, which is then performed by a different (distinct) apparatus. Alternatively, the image processing functionality may be integrated into (or at least closely associated with) the imaging device and its operations.

The acquired image is then subject to an image pre-processing procedure (120). In one embodiment, the image pre-processing is used to estimate t (see equation (1)), which represents a transformation from a standard reference frame to the actual reference frame of the acquired (raw) image. The standard reference frame can be considered as corresponding to a standard presentation of the object being imaged (face, hand, etc) to the imaging device. The transformation t from the standard reference frame to the actual reference frame therefore arises from the particular distance and relative orientation between the imaging device and the object for the acquired image. The image pre-processing may also confirm the portion of the image (if any) that contains the desired object.

In one embodiment, the image processing (120) performs the inverse of transformation t, thereby transforming the view of the object from the actual reference frame back to the standard reference frame. This inverse transformation converts (re-samples) the raw image into a reference image which is then used for subsequent analysis.

One advantage of the use of a reference image is that the feature detectors only need to be trained for this standard presentation of the object—i.e. according to the standard presentation, such as a direct frontal view of a face from a certain distance. This can help to provide feature detectors having better discrimination and accuracy. In addition, the reference image allows an initial estimate for the location of each target point (based on the standard presentation). Consequently, a feature detector for a given target point only has to look for the target point in the vicinity of this initially estimated position, not across the whole raw image. This allows the feature detection to be performed more reliably and more quickly.

In some implementations, the image pre-processing (120) (or alternatively the initial portion of the subsequent step 130) may produce an initial estimate of the b, the shape model parameters (see equation (1)), whether from the raw image and/or from the reference image. This may be done based on a global or relatively high-level analysis of the image and the deformable shape model 310. For example, with reference to FIG. 11, it can be seen that the shape mode 1 represents variation between, on the left, a relatively wide configuration (compared to the height), and, on the right, a relatively narrow configuration. Hence the overall aspect ratio of the imaged hand (width relative to height) provides some basic information regarding the shape model parameters. The initial estimate of the shape model parameters b can help to provide more accurate initial estimates of the locations of the target points for detection within the reference image. This again allows the feature detection to be performed more reliably and more quickly.

Note that in some embodiments, the image pre-processing (120) may be omitted, so that the reference image used for feature detection might be the same as the raw image. This might be because the acquired images generally already have a standard presentation (at least approximately)—for example, in medical images where a radiographer carefully positions the relevant part of the patient before acquiring an image. In other cases, the feature detectors might have been trained on a set of raw images to accommodate a range of presentations for the object (rather than on a set of images corresponding to just one reference frame).

The feature detectors for the target points are then applied to the reference image from the image pre-processing (120) (if performed). Each feature detector utilizes a respective random forest 300 and outputs a response image for its corresponding target point. The response image is a mapping showing, for each position in the response image (which in turn matches a corresponding position in the reference image), the probability (or cost) of the target point for that feature detector being located at that particular position within the response image. Accordingly, the output of (130) is a set of response images, one for each target point in the shape model.

Figure 15:
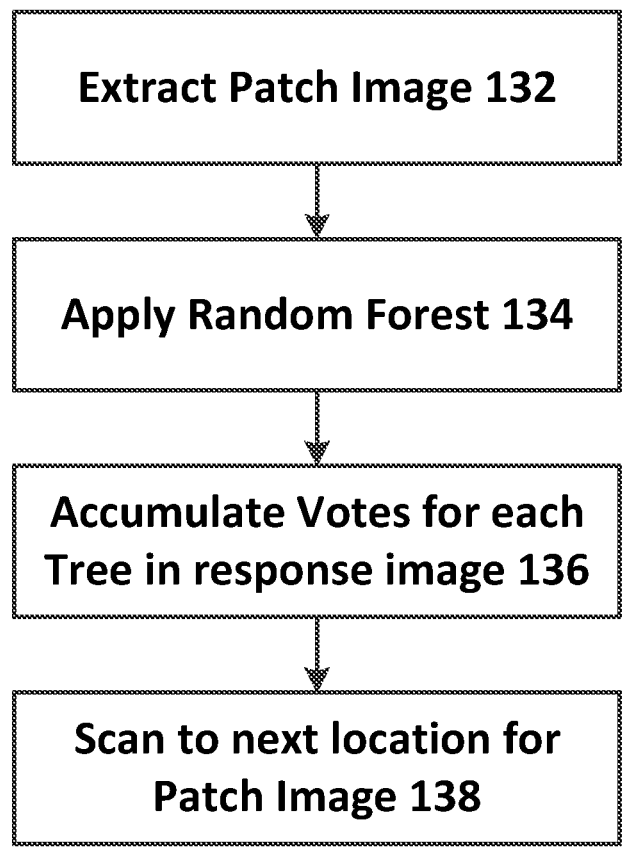
FIG. 15 is a high-level flowchart showing more details of how a response image is generated for a target point in accordance with one embodiment of the invention.

FIG. 15 is a flowchart showing in more detail the processing of one feature detector from (130) in accordance with one embodiment of the invention, and also corresponds in general terms to the processing shown in FIG. 2. First we extract a patch image 12 from the reference image (132). The patch image 12 therefore represents a subset of the reference image. The size of the patch image reflects the scale of image feature(s) associated with the target point and may potentially vary according to the target point being detected. Likewise the shape of the patch image may potentially vary according to the target point being detected—e.g. a rectangular rather than square patch image might be utilized if the target point is associated with an elongated feature.

Figure 17:
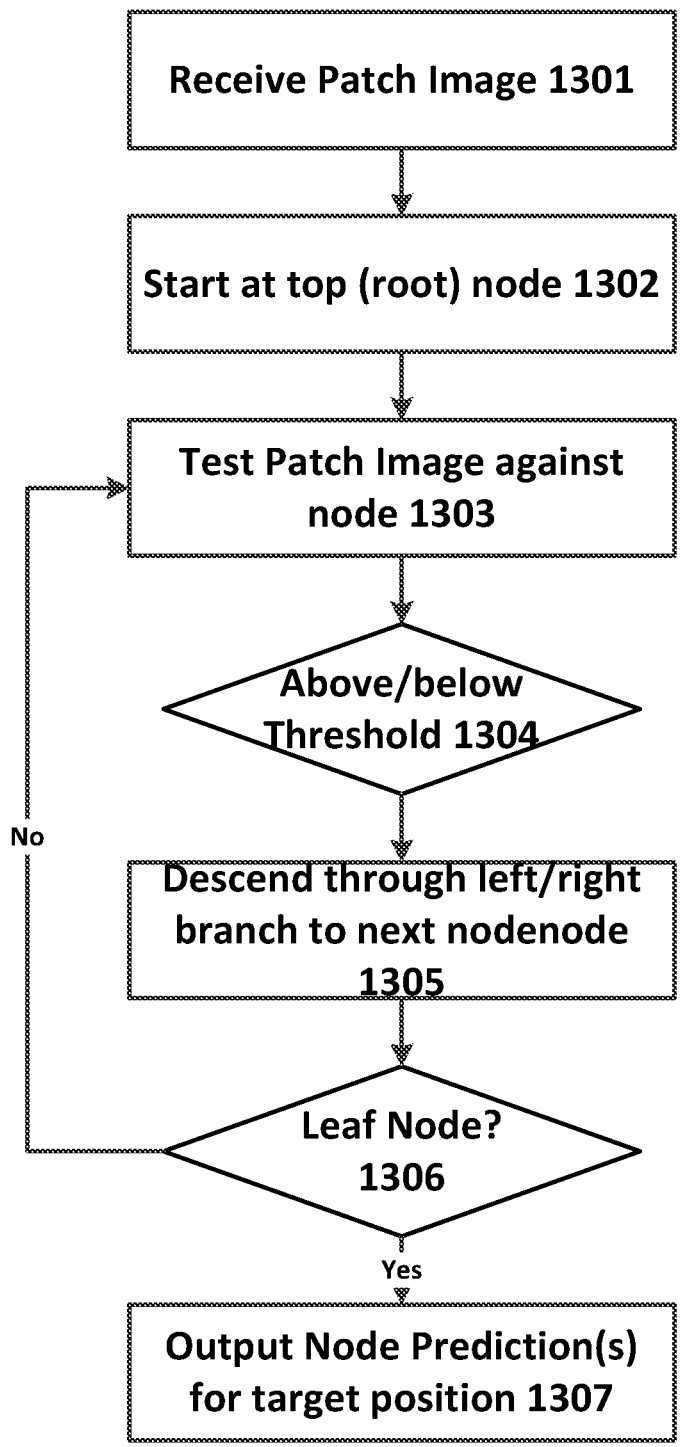
FIG. 17 is a high-level flowchart showing the generation of a prediction for a target point location from an individual random tree as part of the processing of FIG. 15 in accordance with one embodiment of the invention.

A random forest of trees is now applied to the patch image (134), each tree performing a regression to estimate the location of the target point (as described in more detail below with reference to FIG. 17). Each arrow 15 in FIG. 2 represents the regression estimate (prediction) from one tree within the applied random forest for that particular position of the patch image. Each prediction corresponds to position which can be located within a given cell or pixel 16 in the response image 20, and thus can be considered as a vote by the random tree for that cell. The votes from the different trees are accumulated (counted) within the response image (136)—e.g. if two trees predict a target point location corresponding to a particular cell within the response image, then the count (value) for that cell is incremented by two units.

For each target point, the patch image 12 is scanned across the reference image (138), thereby repeating the processing of FIG. 15 at multiple locations. The overall region to be scanned for a given target point is generally only a subset of the reference image, based on an initial estimate for the location of the target point within the reference image, having regard to the standard presentation of the object within the reference image, plus any initial estimate of the shape of the object within the reference image.

A complete response image for a given feature/target point is obtained once the processing of FIG. 15 has been performed for each scanning location of the patch image in the region to be scanned. In one embodiment, the scanning is performed at a granularity or resolution corresponding to the pixel resolution of the reference image—i.e. the processing of FIG. 15 is repeated with the patch image shifted by one pixel at a time across the reference image within the region to be scanned. However, it has been found that using voting from random forests as described herein generally allows the granularity or resolution of the scanning to be reduced while still producing good locations for the target points. In other words, the processing of FIG. 15 may be repeated only for every other pixel in the reference image (within the region to be scanned), or potentially only for one in pixel in three. In other words, the patch image may be shifted by more than one pixel at a time across the reference image (e.g. two or three pixels) within the region to be scanned. This can lead to significant savings in computational time, especially assuming that the reduction in scanning resolution applies in both the x and the y directions of the image.

Although FIG. 2 shows the response image accumulating the individual votes from each tree within the random forest, other implementations may utilize a different approach—for example combining the predictions for the different trees to give a single vote (potentially with uncertainty) for each patch position. It is also possible to generate multiple votes from a single tree, as discussed above. However, in general it has been found that incorporating a single prediction from each tree directly into the response image provides a computationally efficient process and a good response image.

FIG. 2 shows the response image 20 in the form of a grid of cells, where each cell matches a corresponding pixel in the reference image. However, in some implementation the spacing of the cells in the response image 20 may be less than the pixel spacing in the reference image, since this can provide a higher resolution for the response image. In addition, in some implementations the response image may not be formed from a grid of cells that count votes, but could be generated as any form of map or image that reflects the density or probability mapping of the target location, as predicted by the random forest.

It is important however that the predictions from the random forest are retained in the form of a response image rather than being consolidated into a single overall predicted position. One reason for this is that the response image might potentially have two separate probability peaks, or a single elongated peak. The feature detector itself may not be able to determine which of these two peaks truly represents the target point, or which position within the single elongated peak truly represents the target point. However, such a determination can be made using the deformable shape model, as described below, having regard to the full set of response images (target points). In addition, any attempt to consolidate a response image into a single position might result in a poor prediction for the target point—e.g. a midpoint between two peaks in a response image might itself have a very low probability of representing the target point.

Figure 16:
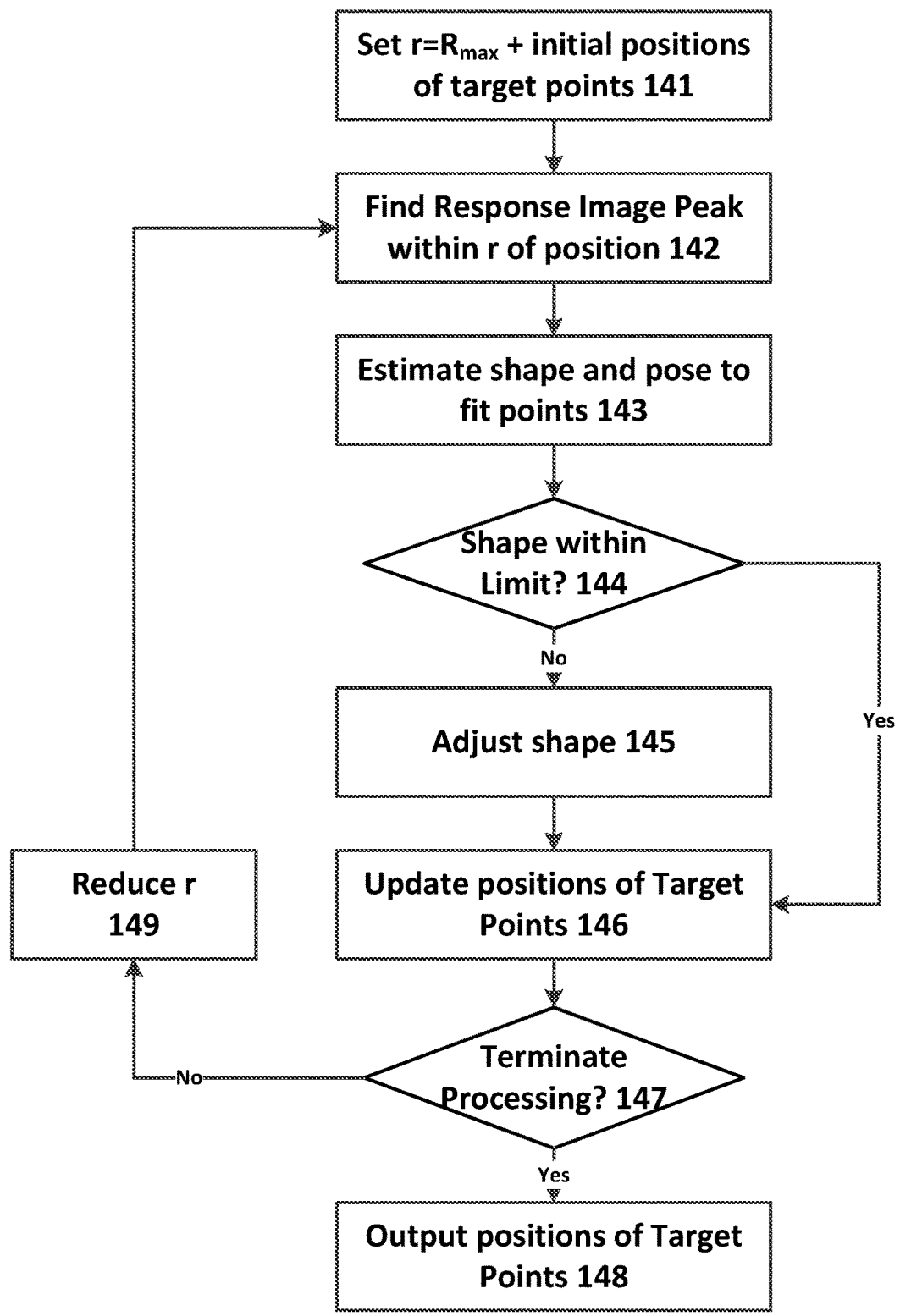
FIG. 16 is a high-level flowchart showing in more details of how the deformable shape model is applied to the response images to generate the locations of the target points in accordance with one embodiment of the invention.

Once the response images have been generated for each target point, the deformable shape model is then applied (140). The deformable shape model constrains the potential deformations of the shape model, i.e. it identifies how common (likely) various deformations are. FIG. 16 illustrates in more detail the application of the deformable shape model (model matching) in accordance with one embodiment of the invention.

The process starts (141) with setting an estimated initial position for each target point in the reference image, based on the known standard presentation of the object (face, etc) within the reference image, and also an estimated initial shape (b). In addition, a parameter r is set to $R_{max}$. This parameter represents how far away from the estimated initial position of a target point the processing will search for a peak in the response image. Accordingly, for each feature/target point, the processing now looks for the peak (largest probability or lowest cost) within the response image for that target point (142), with a distance of r from the estimate initial position. Based on the position of the peak located for each target point, the processing now estimates a shape (b) and pose to fit the overall set of positions that have been found for the target points (143). The pose can be regarded as a correction from the standard presentation, in effect between the originally estimated transformation t, which was used to calculate the reference image from the raw acquired image, and the actual value of this transformation.

A test is now performed to determine whether the estimated shape (b) is plausible according to the deformable shape model (144). In this implementation, a valid region (such as an ellipsoid) is defined in the parameter space of the deformable shape model, corresponding to combinations of parameters which have a sufficiently high probability of occurring. If the estimated shape is located inside this valid region, then the shape is regarded as plausible, with equal probability for all shapes located inside the region. In contrast, if the estimated shape is outside the region, such a shape is prohibited. In this latter case, the shape is modified to the point on the boundary surface of the valid region (145) that is closest to the estimated shape.

The optimization of FIG. 16 therefore focuses on producing the best fit of the target points to the peaks in the response images for shapes within the boundary surface. This can be considered as providing each shape with a binary probability value according to whether it lies inside or outside the valid region. Other implementations may employ a joint estimation between the shape probability and the resource image probabilities based on a more nuanced version of shape probability—i.e. a relatively high shape probability might compensate for a lower resource image probability, and vice versa.

The expected positions of the target points within the reference image are now updated (146) having regard to the estimated pose and shape (the latter having been adjusted to be a valid shape if appropriate). It is next determined whether to perform another iteration (147), e.g. based on one or more criteria such as convergence (stability) of the target positions, the number of iterations already performed, the minimum value of r (see below) and so on. If the termination criteria are satisfied, then the processing outputs the positions of the target points from (146) as the final estimated locations of these target points (148). Otherwise, a new iteration is launched, whereby the value of r is reduced (149) and processing returns to (142). In this case, the processing of (142) now utilizes the updated positions of the target points from (146), and looks for peaks within the respective response images closer than the (now reduced) value of r, thereby helping to localize the target positions within increasing accuracy. Note that if the pose changes significantly, the image may be resampled at this new pose to convert the image back to the standard presentation.

Random Tree

Each random forest 300 comprises a number of random trees. Each tree comprises a hierarchical array of binary nodes, starting from a single root node at the top, and descending to set of leaf nodes at the bottom. A random tree generates a prediction for the location of a target point based on the patch image presented to the random tree as shown in the flowchart of FIG. 17. Thus a patch image is received (1301) and applied to the top node of the tree (1302). A test is made of the data from the patch image at this top node, as described in more detail below (1303) and the outcome of the test is compared with a threshold (1304). If the outcome is below the threshold, we descend on the left branch of the tree, otherwise we descend on the right branch of the tree (1305). A check is now made as to whether we have arrived at a leaf node (1306). If not, we return back to (1303), and now test the patch image against the new node. We continue iterating in this manner until a leaf node is finally reached, whereupon the tree outputs the prediction(s) associated with the relevant leaf node (1307). Note that because the processing of FIG. 17 only involves a series of threshold tests, the tree can be quickly descended to obtain the output of the leaf node.

Different nodes can test different properties or features of the patch image data. As an example, one node may split the patch image into two blocks of pixels, one representing the left-hand side of the patch image, the other the right-hand side of the patch image. The values of the pixels within each block are summed, and the total for the right-hand block is subtracted from the total for the left-hand block. If the result is negative, this indicates that the patch image is (on average) getting brighter from left to right; conversely, a positive result indicates that the patch image is (on average) getting brighter from right to left. Other nodes may test different properties of the patch image data, and/or perform a test against different settings of the threshold.

A random tree is initially created using training data, i.e. images which have been manually annotated with the correct position of the relevant target point. A random selection (subset) of the training data is obtained for each tree in the random forest. For each training sample (i.e. patch image position within an image from the subset of training data), there is a "true" offset or location of the target point, according to the manual annotation. The training seeks to accumulate training samples with similar offsets in the same leaf node of the tree. The expectation is that future, unknown samples which descend the tree to this same leaf node will also have a similar offset.

In one embodiment, the predicted offset from a leaf node (such as arrow 15 in FIG. 2) is taken as some form of average from the offsets of the training samples that were classified into that leaf node. It is also possible to generate multiple predictions from one leaf node, for example, corresponding to the offsets of (some of) the training samples that ended up in this leaf node, or at least reflecting somehow the spread of such training samples.

In one embodiment, the tree is generated from the training data using a set of available node types, where each node type performs a different analysis or calculation of the patch image data (the left/right block subtraction described above is one such analysis). Starting at the root node, a random subset of the node types are considered for this node. A node type and an associated threshold are then determined that give the best separation of the true offsets for the training data—e.g. a particular node type and the associated threshold might tend to split the training samples with an offset pointing to the left from those training samples with an offset pointing to the right. We now select a node type and associated threshold for the left branch of the tree below the root node, and likewise for the right branch of the tree below the root node. In each case, the node type and associated threshold is selected to provide good discrimination between the offsets for those training samples that descend that particular branch of the tree. The above processing then repeats by adding further nodes to each branch of the tree, until the training samples in a given node provide good clustering about a given offset. This node can now form a leaf node of the tree, thereby terminating this particular branch of the tree.

The "random" forest therefore arises because different trees are trained on different subsets of the data. In addition (or possibly alternatively) different trees may be constructed from different available subsets node types at various node locations within the tree. In any event, this variation in the training and resulting construction of the different random trees leads to each tree producing a quasi-independent estimate of the location of a target point. In general, it has been found that the overall set of estimates from the random forest tends to be free of bias (no systematic error), so that the combined outputs of the different trees within a random forest, such as accumulated into a response image, provides a good indication of the true location of the corresponding target point.

Implementation and Applications

The approach described herein may be implemented using one or more computer program comprising instructions for execution by one or more computer systems. In particular, the program instructions may be run on one or more processors of such computer systems to implement the described processing. Furthermore, such computer program implementations are not limited to conventional computers, but may be supported in a wide range of electronic devices that perform some form of image processing, such as gaming machines, medical scanners and analysis machines (X-ray, MRI, etc), facial recognition system (e.g. for passport control and other biometric applications), portable devices such as smartphones, cameras, etc. In addition, the program instructions may be run on general purpose hardware, or alternatively some or all of the program instructions may be run on special purpose hardware, such as a graphical processing unit (GPU), one or more digital signal processors (DSPs), and so on. The program instructions may also be run in parallel as appropriate—e.g. two target points might be processed in parallel, using multiple cores on a single processor, and/or multiple processors in one or more machines, where multiple machines may be tightly linked in one distributed system, or may be more loosely linked, such as a confederation of clients connected via the Internet. Furthermore, some or all of the processing may be implemented in hardware logic, for example using an application specific integrated circuit (ASIC). The deformable shape model and random forests for use in the processing may be available, from any suitable storage, local or remote, such as a hard disk drive, ROM etc, and copied into a memory or directly utilized from the storage at the time of the processing.

The image processing described herein can be utilized in a wide range of applications, for which the following are illustrative examples (but without limitation):

controlling an avatar in a computer game or animation (e.g. movie)—in other words, facial expressions and movements, mouthed speech, etc from a user or actor are detected by imaging the face of the person person, determining the positions of the target points and corresponding deformation of the shape model, and then transferring the same deformation (and hence expression) to the avatar. The processing described herein is quick enough to be performed for each successive image frame of a video, which is important for real-time environments such as gaming.

using the image of the face of a person to control or assist with man-machine interactions, helping the machine to determine, inter alia, the type of face (e.g. age and sex), the expression of the user (surprised, happy, etc), and also potentially assisting with speech recognition (by using additional information based on the movement of the mouse). A related application would be to monitor and model how a user interacts with machine controls, such as a driver in a car or a pilot in an aeroplane, by tracking where the person is looking to perform various operations and as various events occur.

security applications, such as passport control machines, whereby a stored facial image from a passport is compared to a newly acquired image of the person, or where CCTV images are reviewed against a library of photos of known suspects to see if any are present in the CCTV images.

registering one medical image with another medical image, for example, to allow the finger positions to be aligned between two images of the hand. This can help to focus attention on any significant changes that are not caused just by differences in the presentation of the subject for the image—for example, bone growth or repair, tumour development, etc. Another possibility is that the shape model includes items that are not (very) visible in an image itself, such as soft tissue in an X-ray image. By determining the configuration of the shape model in the image, based on the features, e.g. bones, that are more readily visible, then the location of the soft tissue might be estimated. This can be useful for planning medical procedures, comparison with data acquired using other imaging modalities, and so on.

Although the image processing described herein has been applied to two-dimensional images, it can be directly extended to work with three-dimensional images instead. In addition, the skilled person will be aware that there are many potential variations that can be made between different embodiments, including (without limitation): in the details of constructing the random forests from the training data; in the details of generating a positional estimate or estimates from a random tree; in the details of applying the random forest to the reference image (via the patch image); in the details of accumulating positional estimates from the random forest in a response image, and in the nature of the response image itself; in the details of applying the deformable shape model to the set of response images to determine the final target positions, and so on.

DISCUSSION AND CONCLUSIONS

As described herein, voting with Random Forest regressors trained to predict the offset of points from an evaluated patch is an effective method of locating feature (target) points. When incorporated into the Constrained Local Model framework, it achieves excellent performance on a range of facial and medical datasets. The approach has been found to outperform alternative methods (classification and boosted regression) trained on the same data. Using a single vote per tree gives good results, and is significantly faster than alternative approaches. The coarseness of the sampling step for the patch images can be adjusted to balance between speed and accuracy as required. Overall the method is fast, allowing tracking of faces at frame-rate. Note that although the approach has been demonstrated on frontal faces, it is equally applicable (inter alia) to feature detection for non-frontal faces, given a suitable training set. The present description has focused on comparing the voting method with different feature detectors, rather than on producing the best facial feature finder overall. The approach described herein could also be incorporated into a range of other model matching frameworks, such as Active Shape Models or Pictorial Structure Matching [3].

In conclusion, regression-voting using random forest voting leads to fast, accurate and robust results for feature detection when used together with a global (deformable) shape model, such as in a Constrained Local Model framework. The performance of this approach as been assessed on a range of datasets, both images of faces and radiographs of the hand, and the effect of different choices of parameters has also been investigated. It has been shown that voting using random forest regression outperforms classification based methods and boosted regression when trained on the same data.

Although various implementations and embodiments have been described herein, the skilled person will recognize that these implementations and embodiments may be modified or adapted as appropriate according to the various circumstances, and that the scope of the present invention is defined by the appended claims and their equivalents.

REFERENCES

1. Cootes, T. F., Taylor, C. J., Cooper, D., Graham, J.: Active shape models—their training and application. Computer Vision and Image Understanding 61 (1995) 38-59
2. Milborrow, S., Nicolls, F.: Locating facial features with an extended active shape model. In: ECCV. (2008) http://www.milbo.users.sonic.net/stasm.
3. Felzenszwalb, P., Huttenlocher, D. P.: Pictorial structures for object recognition. International Journal of Computer Vision 61 (2005) 55-79
4. Cristinacce, D., Cootes, T. F.: Automatic feature localisation with constrained local models. Pattern Recognition 41 (2008) 3054-3067
5. Saragih, J. M., Lucey, S., Cohn, J. F.: Deformable model fitting by regularized mean-shifts. International Journal of Computer Vision 200-215 (2011)
6. Gall, J., Lempitsky, V.: Class-specific hough forests for object detection. In: CVPR. (2009)
7. Valstar, M., Martinez, B., Binefa, X., Pantic, M.: Facial point detection using boosted regression and graph models. In: CVPR. (2010)
8. Cootes, T. F., Edwards, G. J., Taylor, C. J.: Active appearance models. IEEE Trans. Pattern Analysis and Machine Intelligence 23 (2001) 681-685
9. Belhumeur, P. N., Jacobs, D. W., Kriegman, D. J., Kumar, N.: Localizing parts of faces using a consensus of exemplars. In: CVPR. (2011)
10. Covell, M.: Eigen-points: Control-point location using principal component analysis. In: International Conference on Automatic Face and Gesture Recognition, Killington, USA (1996) 122-127
11. Cootes, T. F., Edwards, G. J., Taylor, C. J.: Active appearance models. In: ECCV. Volume 2. (1998) 484-498
12. Saragih, J., Goecke, R.: A non-linear discriminative approach to AAM fitting. In: Proc. ICCV. (2007)
13. Tresadern, P., Sauer, P., Cootes, T. F.: Additive update predictors in active appearance models. In: British Machine Vision Conference, BMVA Press (2010)
14. Sauer, P., Cootes, T. F., Taylor, C. J.: Accurate regression procedures for active appearance models. In: BMVC. (2011)
15. Zhou, S., Comaniciu, D.: Shape regression machine. In: Information Processing in Medical Imaging, IEEE Computer Society Press (2007) 13-25
16. Zimmermann, K., Matas, J., Svoboda, T.: Tracking by an optimal sequence of linear predictors. IEEE Trans. PAMI 30 (2009) 677-692

17. Ong, E., Bowden, R.: Robust facial feature tracking using shape-constrained multiresolution-selected linear predictors. IEEE PAMI 33 (2004) 1844-1859
18. Dollár, P., Welinder, P., Perona, P.: Cascaded pose regression. In: CVPR. (2010) 1078 1085
19. Ballard, D. H.: Generalizing the hough transform to detect arbitrary shapes. Pattern Recognition 13 (1981) 111-122
20. Leibe, B., Leonardis, A., Schiele, B.: Combined object categorization and segmentation with an implicit shape model. In: ECCV Workshop on Statistical Learning in Computer Vision. (2004)
21. Bourdev, L., Malik, J.: Poselets: Body part detectors trained using 3d human pose annotations. In: ICCV. (2009)
22. Girshick, R., Shotton, J., Kohli, P., Criminisi, A., Fitzgibbon, A.: Efficient regression of general-activity human poses from depth images. In: ICCV. (2011)
23. Dantone, M., Gall, J., Fanelli, G., Van Gool, L.: Real-time Facial Feature Detection using Conditional Regression Forests. In: CVPR (2012)
24. Luo, P., Wang, X., Tang, X.: Hierarchical Face Parsing via Deep Learning. In CVPR (2012)
25. Cao, X., Wei, Y., Wen, F., Sun, J.: Face Alignment by Explicit Shape Regression. In CVPR (2012)
26. Criminisi, A., Shotton, J., Robertson, D., Konukoglu, E.: Regression forests for efficient anatomy detection and localisation in CT studies. In: Medical Computer Vision Workshop. (2010) 106-117
27. Breiman, L.: Random forests. Machine Learning 45 (2001) 5-32
28. Viola, P., Jones, M.: Rapid object detection using a boosted cascade of simple features. In: CVPR. Volume 1. (2001) 511-518
29. Schulter, S., Leistner, C., Roth, P. M., Gool, L. V., Bischof, H.: On-line hough forests. In: BMVC. (2011)
30. Messer, K., Matas, J., Kittler, J., Luettin, J., Maitre, G.: XM2VTSdb: The extended m2vts database. In: Proc. 2nd Conf. on Audio and Video-based Biometric Personal Verification, Springer Verlag (1999) 72-77
31. Kstinger, M., Wohlhart, P., Roth, P. M., Bischof, H.: Annotated facial landmarks in the wild: A large-scale, real-world database for facial landmark localization. In: ICCV Workshops, IEEE (2011) 2144-2151
32. Lindner, C., Thiagarajah, S., Wilkinson, J., arcOGEN Consortium, Wallis, G., Cootes, T. F.: Accurate fully automatic femur segmentation in pelvic radiographs using regression voting. In: MICCAI. (2012)

The invention claimed is:

1. An image processing method for use in fitting a deformable shape model to an acquired image, wherein the deformable shape model specifies a set of target points whose motion is governed by the model, said method comprising:
providing a trained deformable shape model specifying a set of target points;
for each target point specified by the trained deformable shape model, generating a corresponding response image from the acquired image by:
providing a feature detector to locate the target point within the acquired image, wherein said feature detector includes a random forest comprising one or more decision trees;
scanning a patch image across the acquired image to define multiple sampling locations with respect to the acquired image;
for each sampling location of the patch image with respect to the acquired image, performing regression voting using the random forest to produce one or more votes for the location of the target point within the acquired image; and
accumulating the regression votes for all of the multiple sampling locations to generate said response image corresponding to the target point, wherein the response image is a mapping showing, for each position in the response image, the probability or cost of the corresponding target point being located at that point; and
performing an optimization and thereby determining positions within the acquired image for the set of target points, wherein the optimization uses the corresponding response images and is subject to constraint by the deformable shape model.

2. The method of claim 1, wherein different trees in each random forest are trained on different, randomly selected subsets of an overall training data set.

3. The method of claim 1, wherein each decision tree comprises a hierarchical structure of nodes and branches, wherein different nodes respond to different features in the patch image.

4. The method of claim 1, wherein producing one or more votes for a sampling location comprises, for each decision tree, determining a single vote at the mean predicted offset for that decision tree.

5. The method of claim 1, wherein producing one or more votes for a sampling location comprises, for each decision tree, producing a Gaussian spread of votes for that decision tree.

6. The method of claim 1, wherein only a subset of pixels in the acquired image are chosen as sampling locations.

7. The method of claim 1, wherein each response image comprises a grid of cells, and accumulating the regression votes comprises, for each cell, counting the number of regression votes that fall into said cell.

8. The method of claim 1, further comprising an initial step of converting the acquired image to a reference image corresponding to a standard presentation, wherein the response images are generated from the reference image.

9. The method of claim 1, wherein the optimization includes:
providing an initial estimate of the locations of the target points;
searching each response image for a peak within a predetermined distance of the estimated location of a corresponding target point;
updating the estimated locations of the target points to match the peak found in each respective response image;
fitting the deformable shape model to the updated estimated locations of the target points; and
using the fitted deformable shape model to provide updated estimated locations of the target points.

10. The method of claim 9, further comprising iterating the searching, updating, fitting and using operations subject to one or more termination criteria.

11. The method of claim 10, further comprising reducing the predetermined distance for each iteration.

12. The method of claim 9, further comprising defining a valid region for parameters of the deformable shape model, and excluding during the fitting operation any fit of the deformable shape model that lies outside the valid region.

13. The method of claim 1, wherein the image processing method is performed in real-time on successive video frames.

14. The method of claim 1, wherein the deformable shape model relates to a portion of the human body.

15. A non-transitory computer-readable storage medium storing instructions that when executed by a computer cause the computer to perform a method for use in fitting a deformable shape model to an acquired image, wherein the deformable shape model specifies a set of target points whose motion is governed by the model, the method comprising:

provyiding a trained deformable shape model specifying a set of target points;

for each target point specified by the trained deformable shape model, generating a corresponding response image from the acquired image by:

providing a feature detector to locate the target point within the acquired image, wherein said feature detector includes a random forest comprising one or more decision trees;

scanning a patch image across the acquired image to define multiple sampling locations with respect to the acquired image;

for each sampling location of the patch image with respect to the acquired image, performing regression voting using the random forest to produce one or more votes for the location of the target point within the acquired image; and accumulating the regression votes for all of the multiple sampling locations to generate said response image corresponding to the target point, wherein the response image is a mapping showing, for each position in the response image, the probability or cost of the corresponding target point being located at that point; and performing an optimization and thereby determining positions within the acquired image for the set of target points, wherein the optimization uses the corresponding response images and is subject to constraint by the deformable shape model.

16. An image processing apparatus for use in fitting a deformable shape model to an acquired image, wherein the deformable shape model specifies a set of target points whose motion is governed by the model, said apparatus configured to perform the steps of:

providing a trained deformable shape model specifying a set of target points;

for each target point specified by the trained deformable shape model, generating a corresponding response image from the acquired image by:

providing a feature detector to locate the target point within the acquired image, wherein said feature detector includes a random forest comprising one or more decision trees;

scanning a patch image across the acquired image to define multiple sampling locations with respect to the acquired image;

for each sampling location of the patch image with respect to the acquired image, performing regression voting using the random forest to produce one or more votes for the location of the target point within the acquired image; and accumulating the regression votes for all of the multiple sampling locations to generate said response image corresponding to the target point, wherein the response image is a mapping showing, for each position in the response image, the probability or cost of the corresponding target point being located at that position; and performing an optimization and thereby determining positions within the acquired image for the set of target points, wherein the optimization uses the corresponding response images and is subject to constraint by the deformable shape model.

* * * * *